P. NAPIER.
FENDER.
APPLICATION FILED DEC. 8, 1915.

1,219,844.

Patented Mar. 20, 1917.
3 SHEETS—SHEET 1.

Witnesses:
Robert H. Weir
Arthur W. Carlson

Inventor
Peter Napier
By Casper L. Redfield Atty.

P. NAPIER.
FENDER.
APPLICATION FILED DEC. 8, 1915.
1,219,844.
Patented Mar. 20, 1917.
3 SHEETS—SHEET 2.
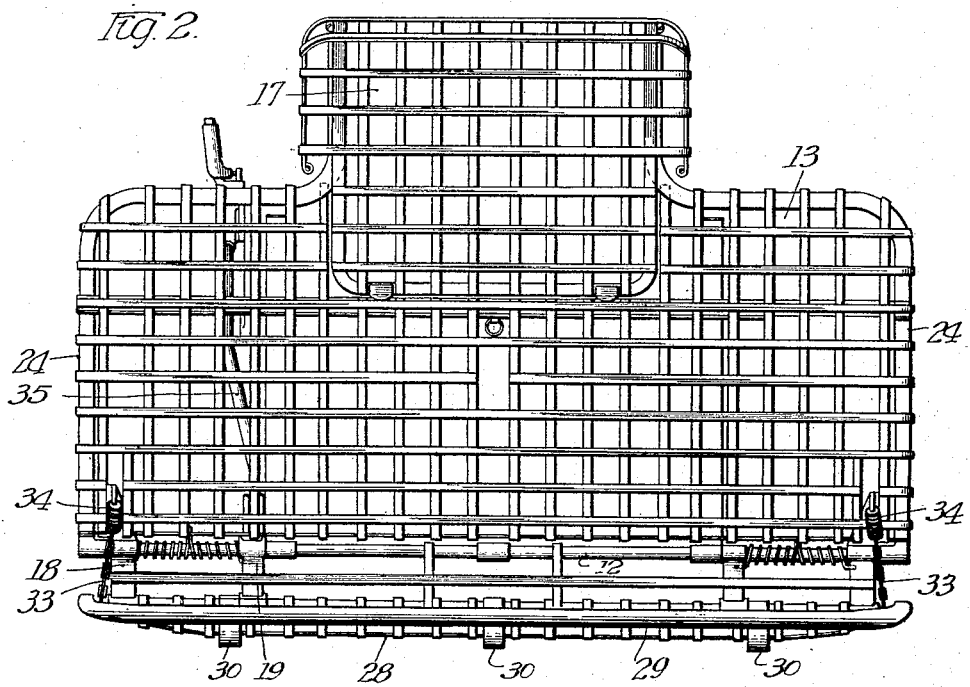
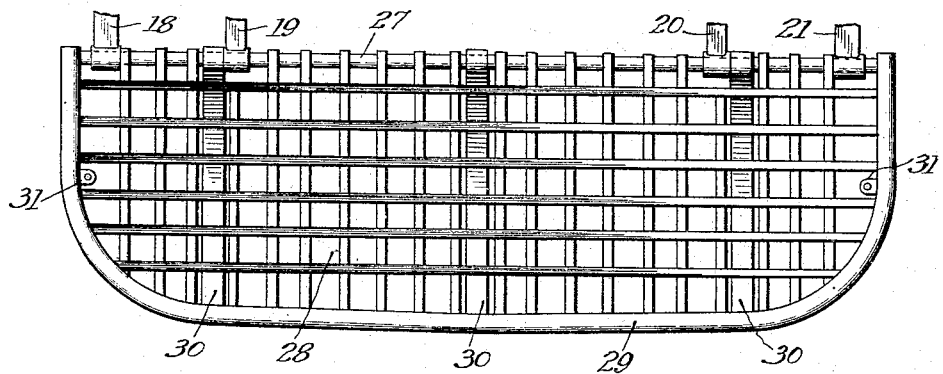
Witnesses:
Robert H. Weir
Arthur W. Carlson
Inventor
Peter Napier
By Casper L. Redfield, Attys

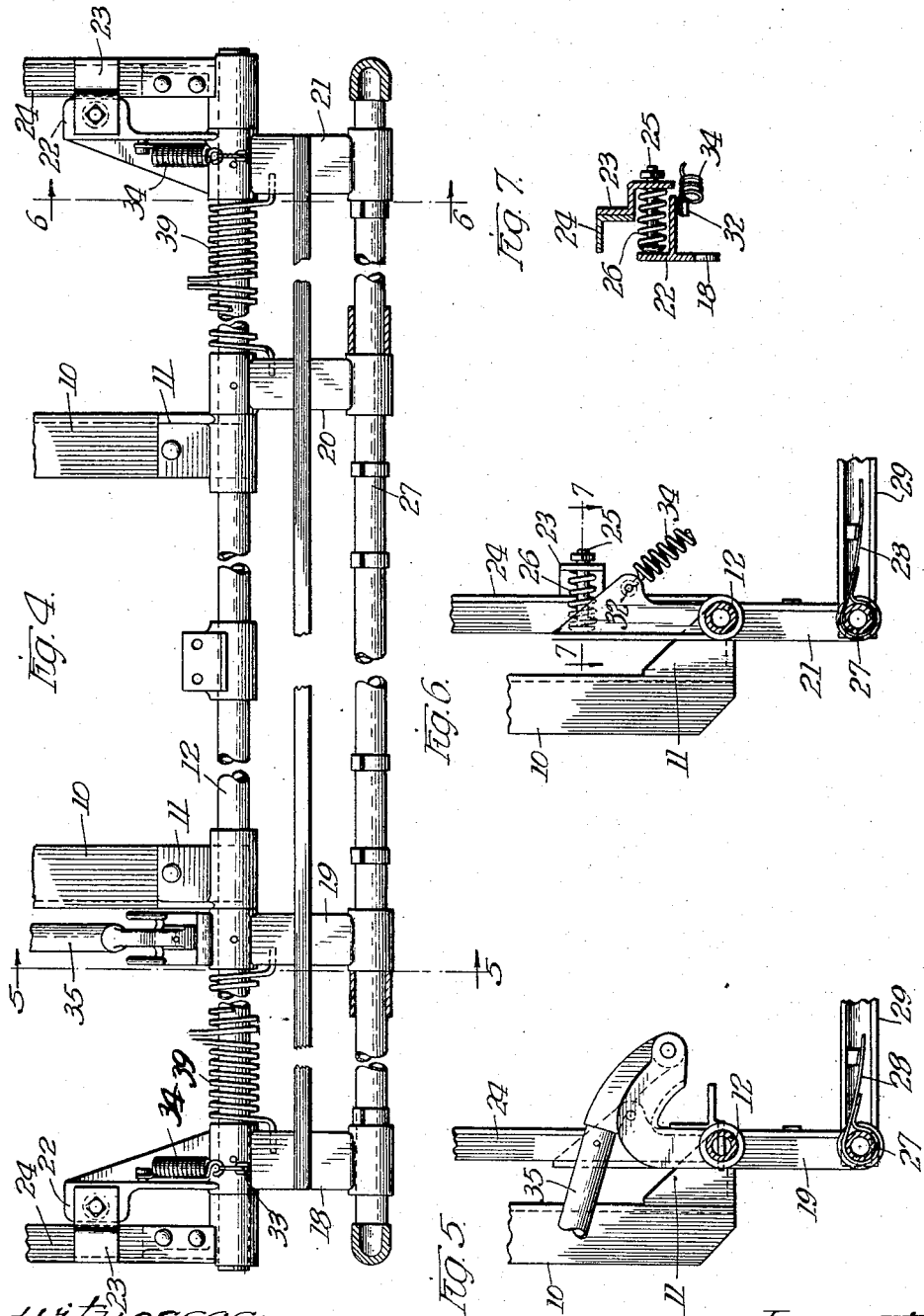

UNITED STATES PATENT OFFICE.

PETER NAPIER, OF CHICAGO, ILLINOIS.

FENDER.

1,219,844.  Specification of Letters Patent.  Patented Mar. 20, 1917.

Application filed December 8, 1915. Serial No. 65,647.

*To all whom it may concern:*

Be it known that I, PETER NAPIER, a citizen of the United States of America, and a resident of the city of Chicago, county of Cook, and State of Illinois, have invented certain new and useful Improvements in Fenders, of which the following is a specification.

My invention relates to fenders and has for its object improvements in such devices.

In the accompanying drawings

Fig. 2 is a front elevation of the fender;

Fig. 3 is a plan of the hinged platform;

Fig. 4 is an enlarged detail, in front elevation, of the connections between the upper and lower portions of the fender;

Fig. 5 is a section on line 5—5 of Fig. 4;

Fig. 6 is a section on line 6—6 of Fig. 4; and

Fig. 7 is a detail, being section on line 7—7 of Fig. 6.

Figure 1:
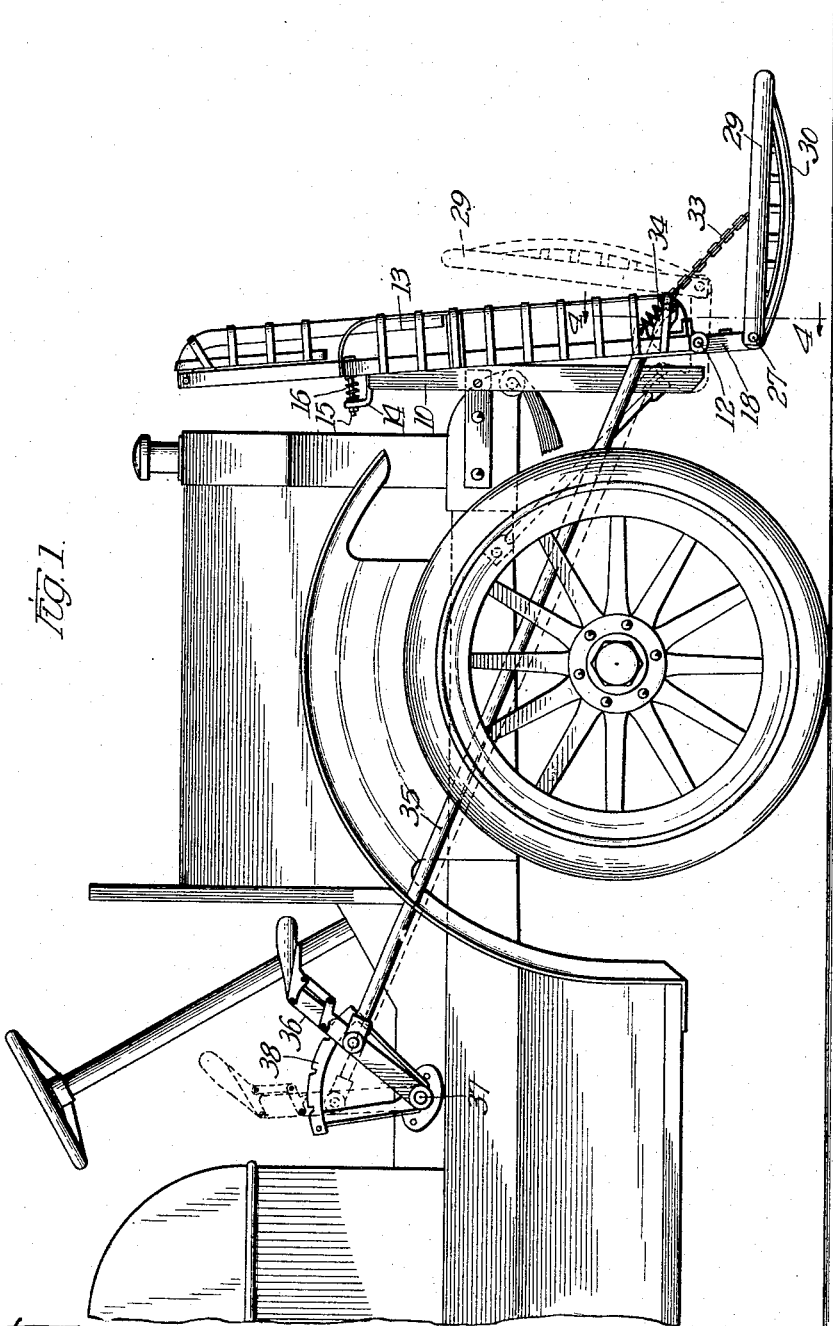
Figure 1 is a side elevation of a portion of an automobile with the fender in position.

Firmly bolted to the front of the automobile, or other vehicle, is a frame work 10, preferably constructed of vertical angle irons. Secured to the lower ends of the angle irons forming the frame 10 are brackets 11 in which is carried a shaft 12. Mounted upon the shaft 12 is the dashboard portion 13 of the fender. The portion 13 is of gridiron construction, the cross bars being of light flat bars which are strong but which will yield under impact. On the top of the frame work 10 are brackets 14 (Fig. 1) provided with bolts 15 and springs 16. These parts are in the nature of buffers which permit the entire dashboard portion to yield rearward when subjected to impact in front. In so yielding, the dashboard turns slightly on the shaft 12. This yield is separate from and in addition to the yield which exists in the bars forming the gridiron construction.

The upper portion 17 (Fig. 2) of the dashboard is hinged above so that it may be lifted as a door to permit access to the front of the automobile. As no claim is here made on this construction it will not be necessary to describe it in detail.

Secured rigidly to the shaft 12 are arms 18, 19, 20 and 21. The arms 18 and 21 are right and left castings which extend above and below the shaft 12. The upper ends of arms 18 and 21 are provided with flanges 22 which project behind brackets 23 secured to the uprights 24 which form part of the dashboard 17. In the brackets 23 are bolts 25 and springs 26 forming buffers for the flanges 22 when the platform portion of the fender is in its lower position. The arrangement and operation of these buffers will be understood from an inspection of the sectional view shown in Fig. 7.

Supported in the lower ends of the arms 18, 19, 20 and 21 is a shaft 27 which forms the rear edge of the platform shown in Fig. 3. This platform is rectangular in shape except that its forward corners are rounded as shown. The bounding bar 29 incloses the three sides not inclosed by the shaft 27. The gridiron or lattice work is basket shaped and has runners 30 on the lower face adapted to slide along the ground when the platform or basket is forced downward by a body thrown upon it.

Extending between lugs 31 (Fig. 3) on bar 29, and pins 32 on the upper ends of arms 18 and 21, are connections consisting of chains 33 and short stiff springs 34. These connections serve to normally support the platform or basket in a horizontal position a short distance above the ground as shown in Fig. 1. If, however, a heavy load falls upon the platform or basket, the springs 34 will yield to permit the basket to turn slightly on its shaft 27. The shortness and stiffness of the springs 34 act to transfer a part of the yield of the platform or basket to the springs 26 with the result that the platform moves about the shaft 12 as well as about the shaft 27. This compound movement of the platform about two pivoting centers has particular advantages which will be best understood by considering them separately and in conjunction.

If the front bar 29 strikes an object directly in front of it and no additional load comes on the platform, then the platform will yield rearwardly about the pivot 12, and will move little or not at all downward. In fact, if the bar 29 strikes the upper edge of an obstruction, the front edge of the platform may rise upward while the platform as a whole moves rearwardly. In an ordinary case in which there is not only a blow on the front of bar 29 but also a load falling upon the platform, the front engaging edge will move downward about pivot 27, and both downward and to the rear about pivot 12. This double or compound movement about centers 12 and 27 gives the device flexibility and pick-up capabilities which do not exist in a platform which is movable about only one center.

The arm 19 extends above the shaft 12, and to the upper end of this arm is connected a rod 35 which has its rear end connected to a hand lever 36 on the automobile. By moving the hand lever 36 on its pivot 37, the platform may be moved on the pivot 12 from the position shown in full lines in Fig. 1 to that shown in dotted lines. A quadrant 38 for the lever 36 serves to hold the platform in its elevated position.

On the shaft 12 are springs 39, one end of each of which bears against a convenient abutment on the frame 10, while the other end projects under one of the arms connecting shafts 12 and 27. The action of these springs is to lift the platform, and the tension is such that there is but slight pressure on bolts 25 and springs 26. This allows for considerable compression of springs 26, and some deflection of springs 39 and 34, when a load comes upon the platform. On the other hand, if the platform strikes the top of an obstruction and tends to rise over it, the lifting of the front of the platform by contact with an object relieves the main part of the load from springs 39, and said springs act to turn arms 18, 19, 20 and 21 on shaft 12 and thus lift the lower parts of the fender over the object. If the object is a stone, the lifting action of springs 39 avoids breaking the apparatus, whereas if it is a man or other living animal, the lifting action avoids crushing him. The flexibility of the chains 33 permits the front part of the platform to rise by turning on pivot 27, whereas a rigid connection between 31 and 32 would not. It will thus be seen that the springs 39 coöperate with the other parts to give flexibility and capability to the apparatus as a whole. The springs 39 also operate to relieve the load on the lever 36 when lifting the platform to the position shown in dotted lines in Fig. 1.

What I claim is:

1. In a fender for a vehicle, a platform or basket portion normally supported in a horizontal position, an arm normally held in a vertical position, a pivotal connection between the lower end of said arm and the rear edge of said platform, a diagonal brace of flexible and yielding material between said platform and arm and serving to support said platform in its horizontal position, and a fixed pivotal support for said arm above the pivotal connection for said platform.

2. In a fender for vehicles, a frame work, a shaft pivoted therein, arms secured to the shaft and extending in opposite directions therefrom, a platform pivoted to the lower ends of said arms, and a yielding connection from the platform to the upper ends of the arms.

3. In a fender for vehicles, a platform, pivotal support on which said platform may be raised or lowered, and a spring under tension to apply lifting action to said platform, said parts being so arranged that when the front part of said platform is raised by contact with an obstruction said spring will act to simultaneously raise the rear portion.

4. In a fender for vehicles, a frame work, arms pivoted to said frame work and extending in opposite directions from their pivoting points, a platform pivoted to the lower ends of the arms, and connections from the upper ends of the arms to the platform, said connections consisting in part of spring and in part of chains.

5. In a fender for vehicles, a platform, a pivotal support therefor, and a brace serving to normally hold said platform in a horizontal position, said brace consisting partly of spring and partly of chain, the spring portion serving as a yielding support for the weight of the platform but permitting downward movement of the platform on its pivot when subjected to load and the chain portion being adapted to fold when the platform is moved upward on its pivot.

6. In a fender for vehicles, a platform, two pivotal supports about which said platform may move, a yielding brace serving to determine the normal position of the platform with respect to one pivot, and a buffer spring serving to determine its normal position with respect to the other pivot.

Chicago, Dec. 6, 1915.

PETER NAPIER.

Copies of this patent may be obtained for five cents each, by addressing the "Commissioner of Patents, Washington, D. C."